UNITED STATES PATENT OFFICE.

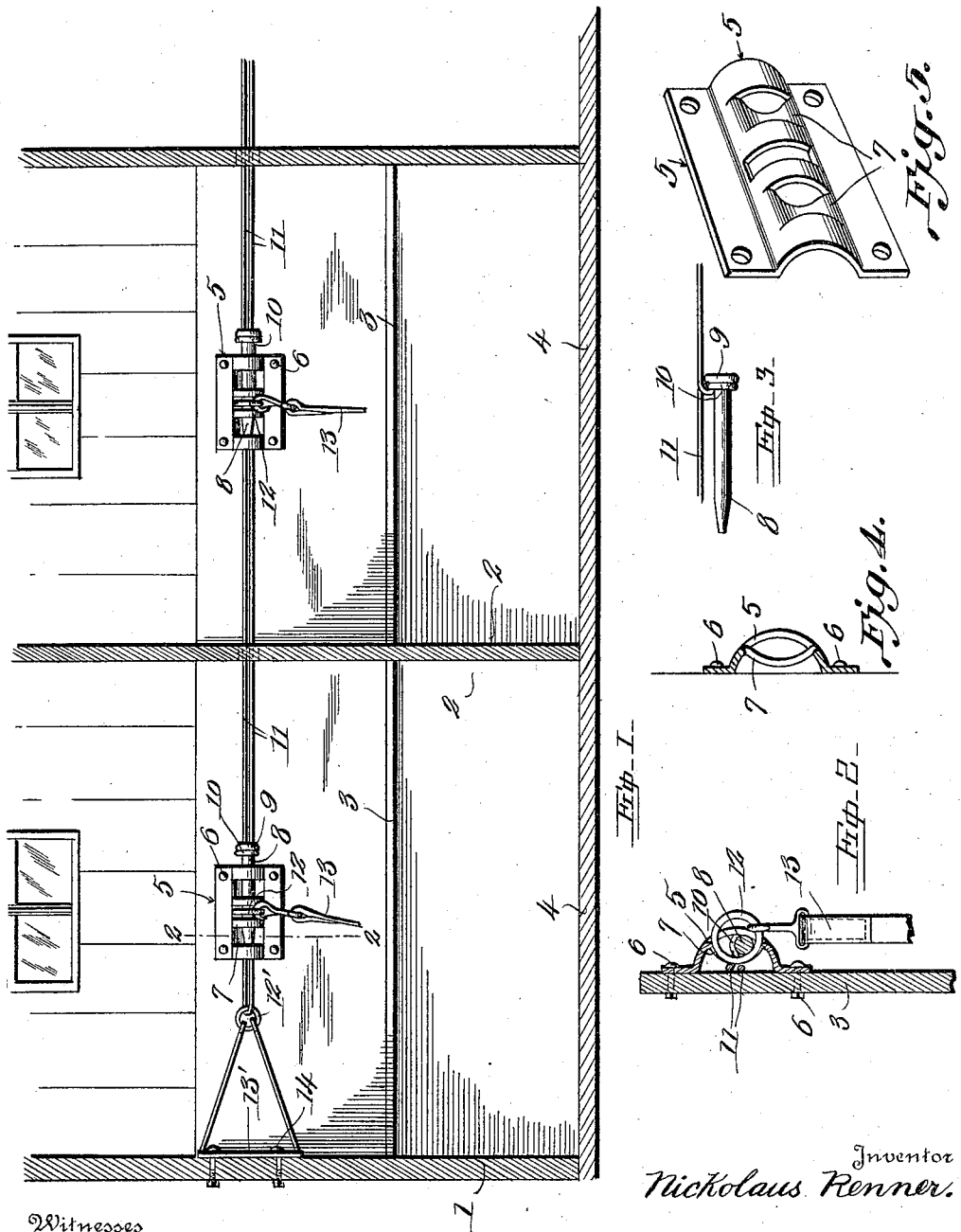

NICKOLAUS RENNER, OF DEFIANCE, OHIO.

MULTIPLE HORSE HOLDER AND RELEASER.

1,179,457.

Specification of Letters Patent. Patented Apr. 18, 1916.

Application filed February 25, 1914. Serial No. 820,946.

*To all whom it may concern:*

Be it known that I, NICKOLAUS RENNER, citizen of the United States, residing at Defiance, in the county of Defiance and State of Ohio, have invented certain new and useful Improvements in Multiple Horse Holders and Releasers, of which the following is a specification.

This invention relates to stables or barns in which horses or cattle may be kept, and has reference particularly to means whereby a number of horses or cattle may be hitched or held and all released either simultaneously or separately, as may be desired.

The object of the invention is to provide improved apparatus for hitching or holding horses, especially in livery stables and whereby the animals may be released quickly, so that they may not perish in case of fire, a specific object being to provide apparatus of the abovementioned character that will be adapted to be cheaply manufactured and erected, and which will be reliable, durable and economical in use.

The above and additional objects are accomplished by such means as are illustrated in their preferred embodiment in the accompanying drawings, described in the following specification and then more particularly pointed out in the claim which is appended hereto and forms a part of this application. In describing my invention in detail reference will be had to the accompanying drawings wherein like characters denote like or corresponding parts throughout the several views, and in which:—

Figure 1 is an elevation of the device, the barn or stable within which it is operated being shown in section; Fig. 2 is an enlarged section on the line 2—2 of Fig. 1; and Fig. 3 is a detail top plan view illustrating the manner in which the retaining bolts or pins are connected to the operating element.

Before proceeding with the description of the drawings, I desire to call particular attention to the fact that while I have evolved my invention with reference to its application in connection with the hitching and unhitching of horses in a barn or stable provided with a series of adjacent stalls, the said device may be readily utilized as a multiple holder and releaser for cattle whether stabled or not.

Referring now to the drawings by numerals, 1 designates a barn or stable within which a plurality of stalls 2 are arranged, said stalls being provided with the usual feed trough 3 and floor 4. It is to provide for the holding and releasing of the horses when arranged within the respective stalls that the present invention is designed and to this end I provide a bracket 5 for each stall, said bracket being fixedly secured as indicated at 6 to the stall front at a point preferably above the feed trough 3. The brackets 5 of the respective stalls being in duplicate, but one of the said brackets will be described in detail. Said bracket in its preferred form is semi-cylindrical in form as indicated in Fig. 2 of the drawings, the respective longitudinal edges of the said semi-cylindrical portion being flared oppositely to provide securing surfaces for the fastening means indicated as at 6. Intermediate the ends of the semi-cylindrical portion of the bracket 5, I provide a plurality of ribs 7, said ribs being formed by slitting the brackets circumferentially a sufficient length and forcing the slit portions thereof inwardly or into the position indicated in the said Fig. 2. Between the unbent portions of the bracket and the ribs formed by the bent portions thereof is disposed a retaining pin or bolt 8 upon one end of which is formed a head or enlargement 9. Said pin 8 is of a size sufficiently large to provide for the disposition of the head 9 thereof beyond one extremity of the bracket, said extended portion of the pin, being embraced by an eye 10 either secured to or integral with a flexible inelastic operating cord or element 11. Said element 11 is fastened at one end at any convenient point upon the exterior of the barn or stable, from which point it extends through all of the stalls 2 to a point within the end stall where it is arranged over an eye 12 from which point it returns to the said point from whence it started. The return portion of the element 11 carries the eyes 10, one eye being provided for each retaining pin or bolt, and one pin or bolt being provided for each bracket 5, said pin or bolt being insertible within the way formed by the bent and unbent portions of the bracket to pass through a ring 12 to which the halter strap 13 of the animal hitched is connected. As indicated in Fig. 1, the eye 12 (although a pulley might equally as well be used) is supported in any suitable manner by a suitable bracket or casting 13' fastened as indicated at 14 in any suitable manner within the interior of the barn.

From the above, taken in connection with the accompanying drawings it will be noted that a pull upon the element 11 in one direction will provide for the simultaneous removal of the pins 8 from their respective bracket supports, such removal of the pins permitting the rings 12 to which the horses 13 are attached to fall unattached to the floor of the trough to thereby make possible the escape of the stabled animals in an event of fire. Attention is also called to the fact that one of the pins may be operated independently of the remaining pins, not by actuation of the elements 11, but by disengaging the said pin from its bracket support.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In a releasing device, the combination with an operating element and a securing pin carried thereby, of a bracket having a centrally bowed slitted portion providing ribs, alternate ribs being reversely bowed to a point intermediate the front and rear of said bracket to provide a way for said pin, and one of said ribs being slotted, whereby the hitching ring may be inserted to a point in the rear of said pin.

In testimony whereof I affix my signature in presence of two witnesses.

NICKOLAUS RENNER.

Witnesses:
R. W. WORTMAN,
MABELLE F. LEWIS.

Copies of this patent may be obtained for five cents each, by addressing the "Commissioner of Patents, Washington, D. C."